United States Patent
Jentz et al.

(10) Patent No.: US 11,603,811 B2
(45) Date of Patent: Mar. 14, 2023

(54) EGR SYSTEM DIAGNOSTICS

(71) Applicant: Ford Global Technologies, LLC, Dearborn, MI (US)

(72) Inventors: Robert Jentz, Westland, MI (US); Edward Doerner, Dearborn Heights, MI (US); Patrick Edward Smithberger, Marine City, MI (US); Sumanth Reddy Dadam, New Hudson, MI (US); Sitaram Rejeti, Farmington, MI (US); Adam Krach, Canton, MI (US); Dave Hagner, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/303,025

(22) Filed: May 18, 2021

(65) Prior Publication Data
US 2022/0372937 A1   Nov. 24, 2022

(51) Int. Cl.
*F02M 26/49* (2016.01)
*F02M 26/48* (2016.01)
*F02M 26/47* (2016.01)
*F02M 26/22* (2016.01)

(52) U.S. Cl.
CPC ............ *F02M 26/49* (2016.02); *F02M 26/22* (2016.02); *F02M 26/47* (2016.02); *F02M 26/48* (2016.02)

(58) Field of Classification Search
None
See application file for complete search history.

(56) References Cited

U.S. PATENT DOCUMENTS

| | | | | |
|---|---|---|---|---|
| 5,190,017 A | * | 3/1993 | Cullen | F02M 26/49 73/114.74 |
| 6,659,095 B2 | * | 12/2003 | Kotwicki | F02D 41/047 123/690 |
| 6,763,708 B2 | * | 7/2004 | Ting | F02D 41/0072 73/114.37 |
| 6,804,601 B2 | * | 10/2004 | Wang | G05B 9/02 701/107 |
| 6,850,833 B1 | * | 2/2005 | Wang | G01F 25/10 73/114.74 |
| 10,345,184 B2 | * | 7/2019 | Choi | F02M 26/06 |
| 10,914,252 B2 | * | 2/2021 | Yoshioka | F02D 41/221 |
| 11,111,870 B2 | * | 9/2021 | Kusunoki | F02M 26/10 |
| 11,274,637 B1 | * | 3/2022 | Rejeti | F02M 26/49 |

(Continued)

FOREIGN PATENT DOCUMENTS

| | | | | | |
|---|---|---|---|---|---|
| CN | 107687381 A | * | 2/2018 | ............ | G01L 13/00 |
| CN | 109630324 A | * | 4/2019 | ......... | F02D 41/0052 |

(Continued)

*Primary Examiner* — Kevin R Steckbauer
(74) *Attorney, Agent, or Firm* — Vincent Mastrogiacomo; McCoy Russell LLP

(57) ABSTRACT

Methods and systems are provided for diagnostics of exhaust gas recirculation (EGR) components including an EGR pressure sensor. In one example, a method may include comparing a current relationship between an output of the EGR pressure sensor and a manifold air pressure (MAP) and a pre-calibrated relation between the output of the EGR pressure sensor and the MAP to detect degradation of the EGR pressure sensor.

20 Claims, 5 Drawing Sheets

(56) References Cited

U.S. PATENT DOCUMENTS

| | | | | |
|---|---|---|---|---|
| 2002/0189599 | A1* | 12/2002 | Kotwicki | F02D 41/1448 |
| | | | | 123/568.22 |
| 2016/0222925 | A1* | 8/2016 | Baeuerle | F02M 26/06 |
| 2018/0038760 | A1* | 2/2018 | Choi | F02M 26/06 |
| 2019/0107064 | A1* | 4/2019 | Yoshioka | F02M 26/47 |
| 2020/0332738 | A1* | 10/2020 | Kusunoki | F02D 41/222 |
| 2021/0164381 | A1* | 6/2021 | Kim | F02M 26/48 |

FOREIGN PATENT DOCUMENTS

| | | | | |
|---|---|---|---|---|
| CN | 110566381 A | * | 12/2019 | F02M 26/47 |
| CN | 107687381 B | * | 7/2020 | G01L 13/00 |
| CN | 109630324 B | * | 5/2021 | F02D 41/0052 |
| CN | 112824669 A | * | 5/2021 | F02B 33/34 |
| CN | 110566381 B | * | 7/2021 | F02M 26/47 |
| CN | 113606064 A | * | 11/2021 | F02D 41/0055 |
| DE | 102004016936 B4 | * | 3/2014 | F02D 21/08 |
| DE | 102013218612 A1 | * | 3/2015 | F02D 41/0055 |
| DE | 102019220438 A1 | * | 6/2021 | |
| DE | 102020203744 A1 | * | 6/2021 | F01N 11/005 |
| EP | 3726043 A1 | * | 10/2020 | F02D 41/0007 |
| GB | 2400455 A | * | 10/2004 | F02D 21/08 |
| JP | 2005282379 A | * | 10/2005 | F02D 41/0055 |
| JP | 2013144961 A | * | 7/2013 | |
| JP | 2013144961 A | | 7/2013 | |
| JP | 5403057 B2 | * | 1/2014 | F02D 41/0055 |
| JP | 2020176564 A | * | 10/2020 | F02D 41/0007 |
| WO | WO-2011016124 A1 | * | 2/2011 | F02D 41/0055 |
| WO | WO-2012157024 A1 | * | 11/2012 | F02D 41/0077 |
| WO | WO-2014087809 A1 | * | 6/2014 | F02D 41/0047 |

* cited by examiner

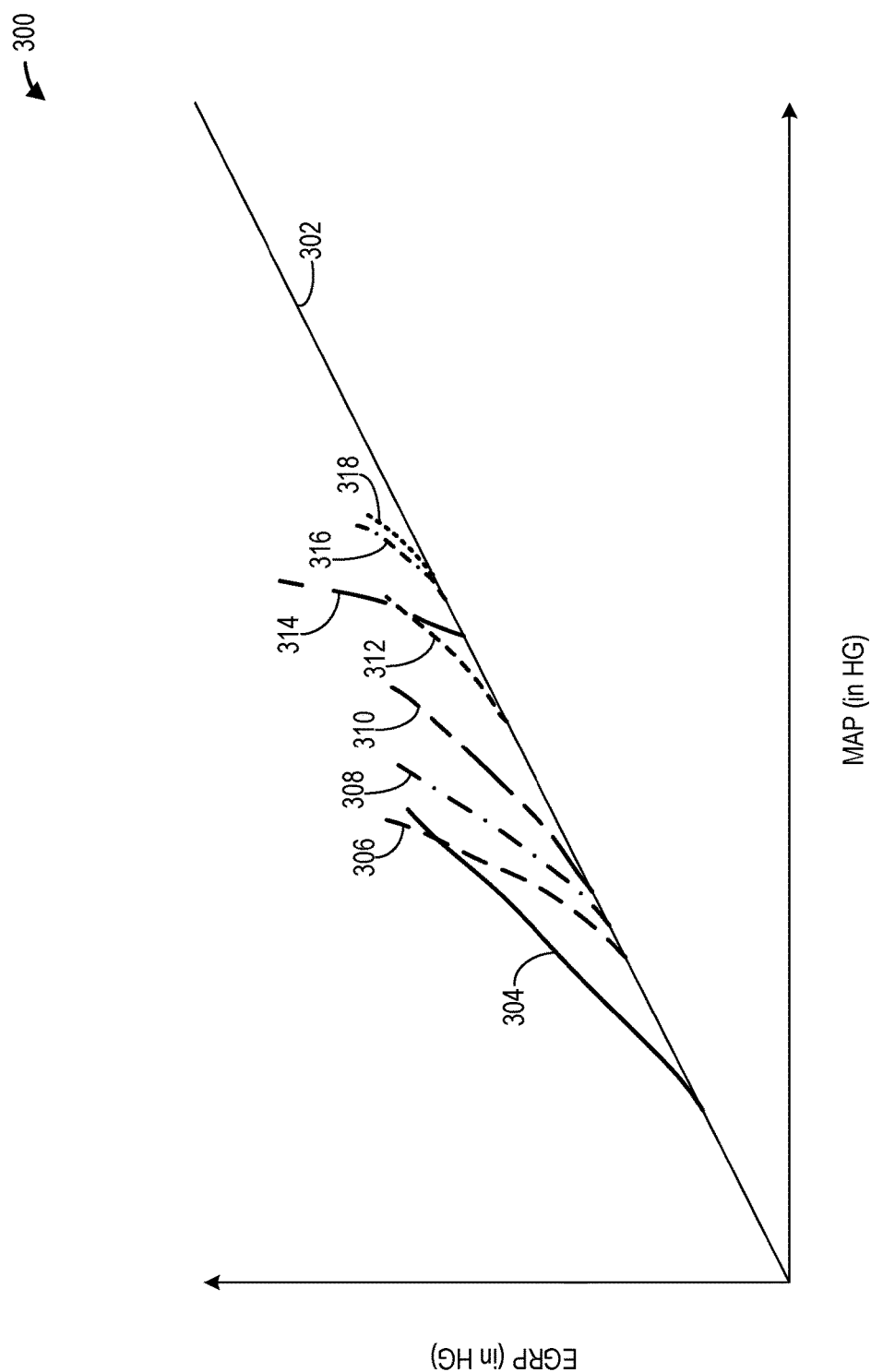

EGR SYSTEM DIAGNOSTICS

FIELD

The present description relates generally to methods and systems for diagnosing components of an exhaust gas recirculation (EGR) system including a pressure sensor.

BACKGROUND/SUMMARY

Engine systems may utilize recirculation of exhaust gas from an engine exhaust system to an engine intake system, a process referred to as exhaust gas recirculation (EGR), to reduce regulated emissions. An EGR valve may be controlled to achieve a desired intake air dilution for the given engine operating conditions. Traditionally, the amount of EGR routed through the EGR system is measured and adjusted based on engine speed, engine temperature, and load during engine operation to maintain desirable combustion stability of the engine while providing emissions and fuel economy benefits. EGR effectively cools combustion chamber temperatures thereby reducing NOx formation. Also, EGR reduces pumping work of an engine resulting in increased fuel economy. EGR flow through an EGR passage may be estimated via one or more pressure sensors coupled to the EGR passage. This estimated flow rate may be used to adjust EGR valve opening and regulate EGR flow.

In order to maintain robust operation of the EGR system, periodic diagnostics of the EGR system components is desired. One example approach for EGR system diagnostics is shown by Ting et al. in U.S. Pat. No. 6,763,708. Therein, a pressure in the intake manifold is estimated via a manifold air pressure (MAP) sensor, and the intake manifold pressure is also modeled based on engine operating conditions and possible restrictions in the EGR system. The controller may detect degradation of the EGR system such as a restriction based on a difference between the measured intake manifold pressure and the modeled intake manifold pressure.

However, the inventors herein have recognized potential issues with such systems. As one example, degradations in the EGR system may not be limited to restrictions but may also be caused due to degradation of sensors such as a pressure sensor used to detect EGR flow rate through the EGR passage. Erroneous estimation of EGR flow rate via a degraded sensor may result in inaccurate adjustment of EGR valve opening which may result in undesired engine dilution. In one example, EGR flow rate may be estimated based on a pressure drop as estimated via a differential pressure sensor across a fixed orifice in the EGR passage. However, presence of the orifice causes a restriction in the EGR flow causing a decrease in the maximum possible flow. Therefore, it is desired to be able to estimate EGR flow accurately without the presence of the constriction and to be able to detect any degradations of the EGR sensor. Further, an EGR cooler may be housed in the EGR passage to cool the EGR being delivered to the intake manifold. Over time and with use, contaminants may deposit within the EGR cooler, thereby plugging the EGR cooler and affecting EGR flow.

In one example, the issues described above may be addressed by a method for diagnosing degradation of an exhaust gas recirculation (EGR) pressure sensor based on comparison of a current relationship between an output of the EGR pressure sensor and a manifold air pressure (MAP), and a pre-calibrated relation between the output of the EGR pressure sensor and the MAP. In this way, by monitoring correlation between an intake manifold pressure and a pressure drop across the EGR valve, degradation of the EGR sensor may be detected.

As one example, EGR flow rate through an EGR passage may be estimated as a function of a pressure drop across the EGR valve. A first EGR sensor may be positioned upstream of the EGR valve and a second EGR sensor may be coupled downstream of the EGR valve, and the pressure difference between the first and second EGR sensors may provide the pressure drop across the EGR valve. Over a range of engine operating conditions, the intake manifold pressure (MAP) and EGR pressure (EGRP) downstream of the EGR valve (as estimated via the second EGR sensor) may be recorded and plotted (EGRP vs. MAP) to generate a series of calibration curves with each curve corresponding to a set of engine operating conditions. The calibration curves may be interpolated over a wider range of engine operating conditions. Each of the calibration curves may represent a quadratic equation. During conditions when EGR is not desired and the EGR valve is in a closed position, MAP may be substantially equal to EGRP. A difference between MAP and EGRP at EGR valve closed position may be used to estimate an offset for rationalization of the second EGR sensor. During EGR supply, when the EGR valve is opened, based on the current engine operating conditions, a pre-calibrated quadratic curve for the EGRP vs. MAP plot may be retrieved from the controller memory and compared to a current change in MAP with EGRP. A degradation of the second EGR sensor may be indicated in response to the current EGRP vs. MAP plot deviating from the calibrated plot beyond a tolerance band yet following a quadratic pattern. Further, a plugging of an EGR cooler coupled to the EGR passage downstream of the valve may be indicated in response to the current EGRP vs. MAP plot deviating from the calibrated plot beyond the tolerance band and not following a quadratic pattern. For a robust EGR second sensor and EGR cooler, when the EGR valve is open higher than a threshold level, a ratio of EGR pressure upstream of the EGR valve to EGR pressure downstream of the EGR valve may be equal to one.

In this way, by estimating manifold air pressure and EGR pressure upstream and downstream of an EGR valve, EGR flow may be estimated and degradation in an EGR pressure sensor may be diagnosed. Further, by monitoring a nature of the EGRP vs. MAP plot, a plugging of the EGR cooler may be determined. The technical effect of using a first pressure sensor and a second pressure sensor upstream and downstream of the EGR valve, respectively, for EGR flow rate estimation is that an orifice in the EGR passage may be eliminated thereby increasing maximum possible EGR flow. By accurately estimating an offset of an EGR pressure sensor during closure of the EGR valve, the sensor may be rationalized and EGR flow rate measurement may be improved during subsequent EGR supply. Overall, by monitoring robustness of the EGR pressure sensor, EGR flow rate estimation may be improved and desired engine dilution may be provided, thereby improving fuel efficiency and emissions quality.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 shows an example plot of EGR pressure downstream of an EGR valve (EGRP) vs. intake manifold air pressure (MAP) over a range of engine operating conditions.

DETAILED DESCRIPTION

Figure 1:
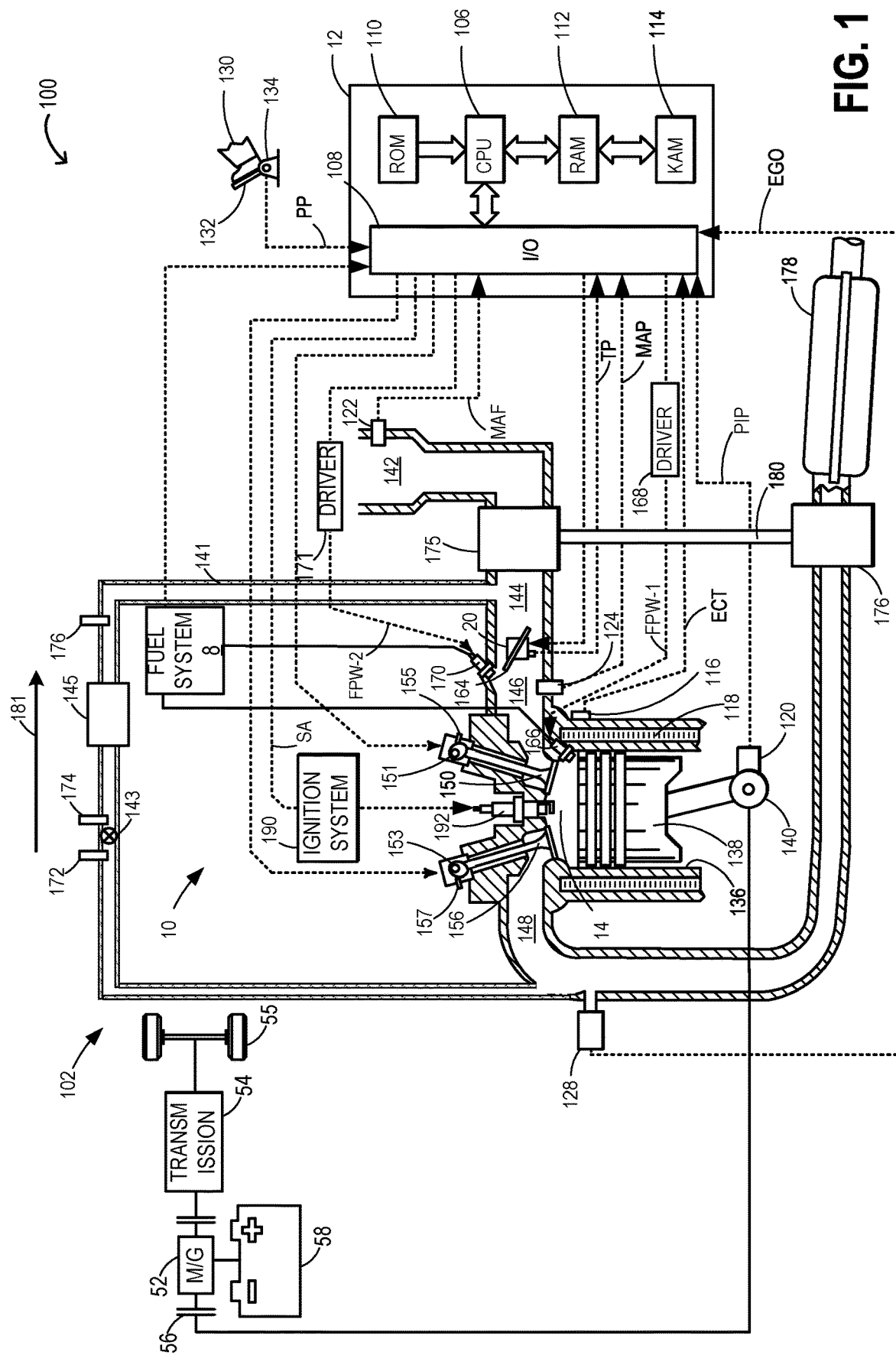
FIG. 1 shows an example engine system for a vehicle including an EGR system.
Figure 4:
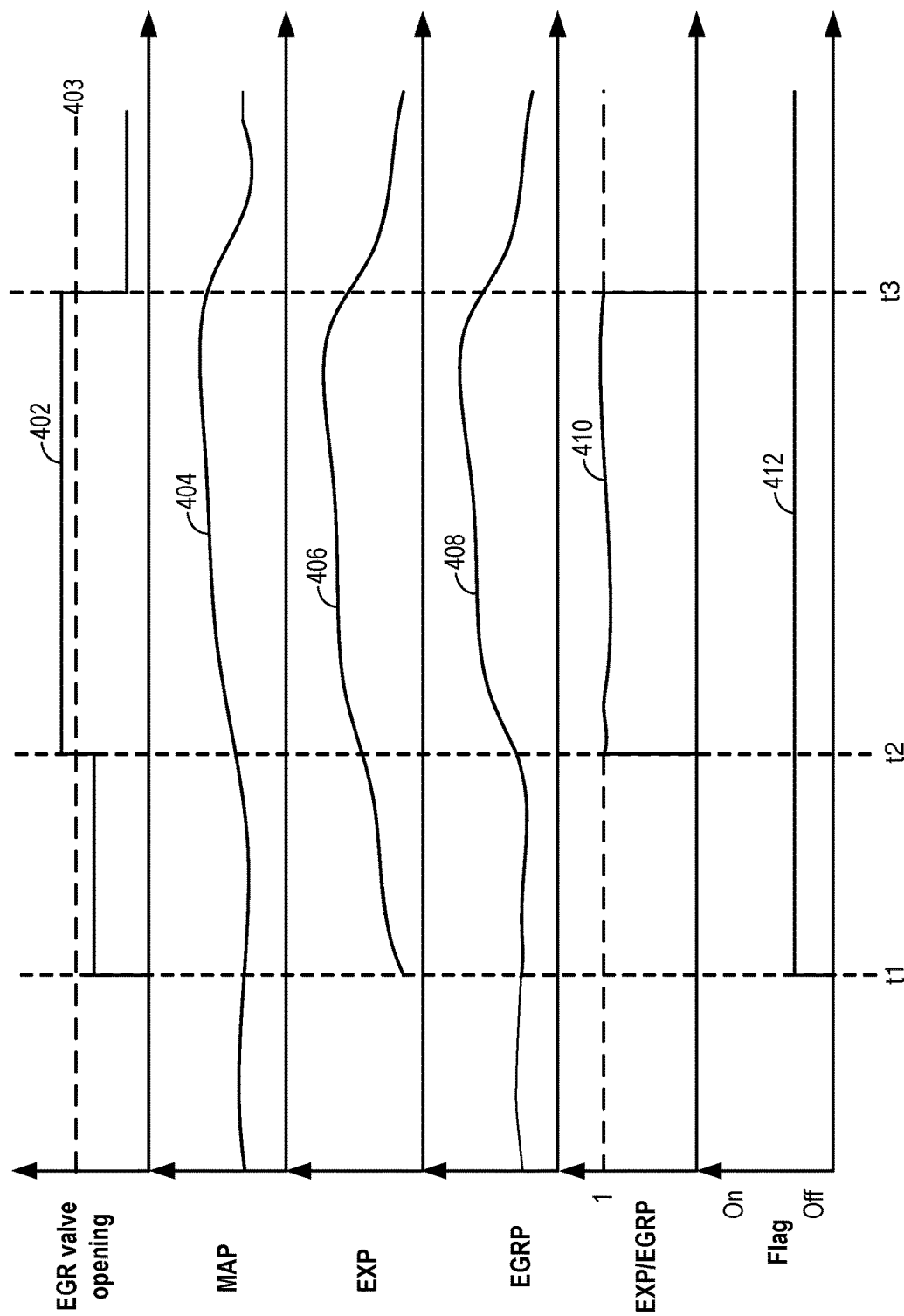
FIG. 4 shows an example diagnostics of the EGR system pressure sensors.

The following description relates to systems and methods for rationalizing and diagnosing an exhaust gas recirculation (EGR) system pressure sensor. A hybrid vehicle system including an engine system is shown in FIG. 1. The engine system of FIG. 1 includes an EGR system for delivery of exhaust gas from the exhaust to the intake manifold. The flow rate of EGR may be estimated based on input from pressure sensors coupled to an exhaust passage upstream and downstream of an EGR valve. The pressure sensor downstream of the EGR valve may be rationalized and diagnosed via the method shown in FIGS. 2A-2B using calibration plots similar to those shown in FIG. 3. An example of EGR pressure sensor diagnostics is shown in FIG. 4.

FIG. 1 depicts an example embodiment 100 of a hybrid vehicle 102 including a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 175 arranged between intake passages 142 and 144, and an exhaust turbine 176 arranged along exhaust passage 148. Compressor 175 may be at least partially powered by exhaust turbine 176 via a shaft 180 where the boosting device is configured as a turbocharger. The turbocharger may be a variable geometry turbocharge (VGT) where exhaust turbine 176 may include guiding vanes arranged in a nozzle of the turbine. Gas flow into the exhaust turbine 176 may be adjusted by varying a position of the guiding vanes. A throttle 20 including a throttle plate 164 may be provided along an intake passage of the engine for varying the flow rate and/or pressure of intake air provided to the engine cylinders. For example, throttle 20 may be disposed downstream of compressor 175 as shown in FIG. 1, or alternatively provided upstream of compressor 175.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

As a non-limiting example, cylinder 14 is shown including two fuel injectors 166 and 170. Fuel injector 166 is configured to deliver diesel or gasoline to the combustion chamber from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alternative, alcohol-based fuel due to the lower volatility of some alcohol-based fuels. Alternatively, the injector may be located overhead and near the intake valve to improve mixing.

Fuel injector 170 is shown arranged in intake passage 146, rather than in cylinder 14, in an optional configuration that provides what is known as port injection of fuel (hereafter referred to as "PFI") into the intake port upstream of cylinder 14. Fuel injector 170 may inject fuel such as gasoline, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

As described above, FIG. 1 shows only one cylinder of a multi-cylinder engine. As such each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

The engine may include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. In this example, the EGR passage 141 is coupled to the intake passage 144 upstream of the throttle 20, however, in alternate embodiments, the EGR passage 141 may be coupled to the intake passage 144 downstream of the throttle 20. A direction of flow of EGR through the EGR passage 141 is shown by arrow 181. The amount of EGR provided to intake passage 144 may be varied by controller 12 via EGR valve 143. A first EGR pressure sensor 172 is coupled to the EGR passage 141 upstream of the EGR valve 143 and a second EGR pressure sensor 174 may be coupled to the EGR passage 141 downstream of the EGR valve 143. A pressure differential across the EGR valve 143 as estimated based on outputs of the first EGR pressure sensor 172 and the second EGR pressure sensor 174 may be used to estimate a flow rate of EGR through the EGR passage 141. As such, the pressure in an EGR passage upstream of an EGR valve, such as EGR valve 143, is lower than the pressure in the passage downstream of the EGR valve and the difference in pressure upstream and downstream of the EGR valve may be directly proportion to the EGR flow rate. Further, additional EGR sensors may be arranged within the EGR passage and may provide an indication of temperature, and oxygen concentration of the exhaust gas. An EGR cooler 145 may be coupled to the may be coupled to the EGR passage downstream or upstream of the EGR valve 143. A temperature sensor 176 may be coupled to the EGR passage downstream of the EGR cooler 145 to estimate a temperature of EGR exiting the EGR cooler 145.

When EGR valve 143 is open, a portion of the exhaust gas generated at the cylinder 14 is diverted to the EGR passage 141. Controller 12 may command opening of the EGR valve 143 based on the estimated EGR flow rate in combination with other input such as engine load, speed, and temperature. While constant EGR flow is desirable to suppress NOx formation, under certain conditions, the EGR valve 143 is maintained closed. For example, during cold starts, exhaust gas pressure is low and as a result, the EGR valve 143 is kept closed to allow gas pressure to accumulate. Similarly, during engine operation under zero load, such as idling, the EGR valve 143 is closed. Allowing EGR to flow during engine idling may lead to combustion instability and erratic idling. Furthermore, during engine operation under peak loads, e.g., the engine is operating close to or at maximum load, dilution at the combustion chamber due to EGR is not desired due to the diminished power output resulting from burning a gas mixture with lower oxygen concentration. Thus during high engine loads, the EGR valve 143 is also closed.

It will be appreciated that while the embodiment of FIG. 1 shows high pressure EGR (HP-EGR) via an HP-EGR passage coupled between the engine intake downstream of the turbocharger compressor and the engine exhaust upstream of the turbine, in alternate embodiments, the engine may be configured to also provide low pressure EGR (LP-EGR) being provided via an LP-EGR passage coupled between the engine intake upstream of the turbocharger compressor and the engine exhaust downstream of the turbine. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. When distinct HP-EGR and LP-EGR passages are included, the respective EGR flows may be controlled via adjustments to respective EGR valves.

Health of the EGR pressure sensors and the EGR cooler have be monitored periodically and/or opportunistically. During flow of EGR through a high-pressure EGR system at a current engine speed-load condition, the EGR pressure (EGRP) downstream of the EGR valve may be estimated via the second EGR pressure sensor 174, a manifold air pressure (MAP) may be estimated, a first plot of EGRP vs. MAP may be generated over a range of openings of the EGR valve 143 at the current engine speed-load condition, a second plot of EGRP vs. MAP over the range of openings of the EGR valve at an engine speed-load condition corresponding to the current engine speed-load condition may be retrieved from the controller memory, and degradation of the second EGR pressure sensor may be indicated based on a correlation between the first plot and the second plot. The second plot may follow a quadratic curve over an increase in the opening of the EGR valve 143. The second EGR pressure sensor 174 may be indicated to be degraded in response to the first plot deviating from the second plot outside of a tolerance band, and the first plot following a quadratic curve. The EGR cooler 145 may be indicated to be plugged in response to the first plot deviating from the second plot outside of the tolerance band, and the first plot not following a quadratic curve.

Further, upon opening the EGR valve 143 to above a threshold opening, in response to the ratio of the output of the second EGR pressure sensor 174 to an output of the first EGR pressure sensor 172 being substantially equal to one, each of the first EGR pressure sensor 172 and the second EGR pressure sensor 174 may be indicated to be not degraded. During a closure of the EGR valve 143, the second EGR pressure sensor 174 may be rationalized with an off-set estimated based on a difference between the output of the second EGR pressure sensor 174 and the MAP. In response to the indication of the EGR cooler 145 being plugged or the indication of the second EGR pressure sensor 174 being degraded, the flow of EGR through the HP EGR passage may be reduced or suspended.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; manifold absolute pressure signal (MAP) from sensor 124; EGR flow rate from first EGR pressure sensor 172 and second EGR pressure sensor 174. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

In this way, the system of FIG. 1 enables a method of operating an engine wherein a desired engine dilution is provided by combining a plurality of engine diluents, the diluents selected based on respective combustion stability limits.

In some examples, vehicle 102 may be a hybrid vehicle with multiple sources of torque available to one or more vehicle wheels 55. In other examples, vehicle 102 is a conventional vehicle with only an engine, or an electric vehicle with only electric machine(s). In the example shown, vehicle 102 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

In this way, the systems of FIG. 1 provide for a system for a vehicle, comprising: an exhaust gas recirculation (EGR) passage coupling an exhaust passage upstream of an exhaust turbine to an intake passage downstream of an intake compressor, an EGR valve housed in the EGR passage to regulate EGR flow through the EGR passage, a first EGR pressure sensor coupled to the EGR passage upstream of the EGR valve and a second EGR pressure sensor coupled to the EGR passage downstream of the EGR valve, an EGR cooler housed in the EGR passage downstream of each of the first EGR pressure sensor, the EGR valve, and the second EGR pressure sensor, a manifold air pressure (MAP) sensor coupled to an engine intake manifold, and a controller storing instructions in non-transitory memory that, when executed, cause the controller to: when the first EGR pressure sensor is new, calibrate a plurality of calibration plots of an output of the second EGR pressure sensor (EGRP) vs. an output of the MAP sensor (MAP) over a range of openings of the EGR valve for a plurality of engine speed-load conditions, and during subsequent engine operation, carry out a diagnostic routine for the second EGR pressure sensor and the EGR cooler based on the calibrated plots.

Figure 2A:
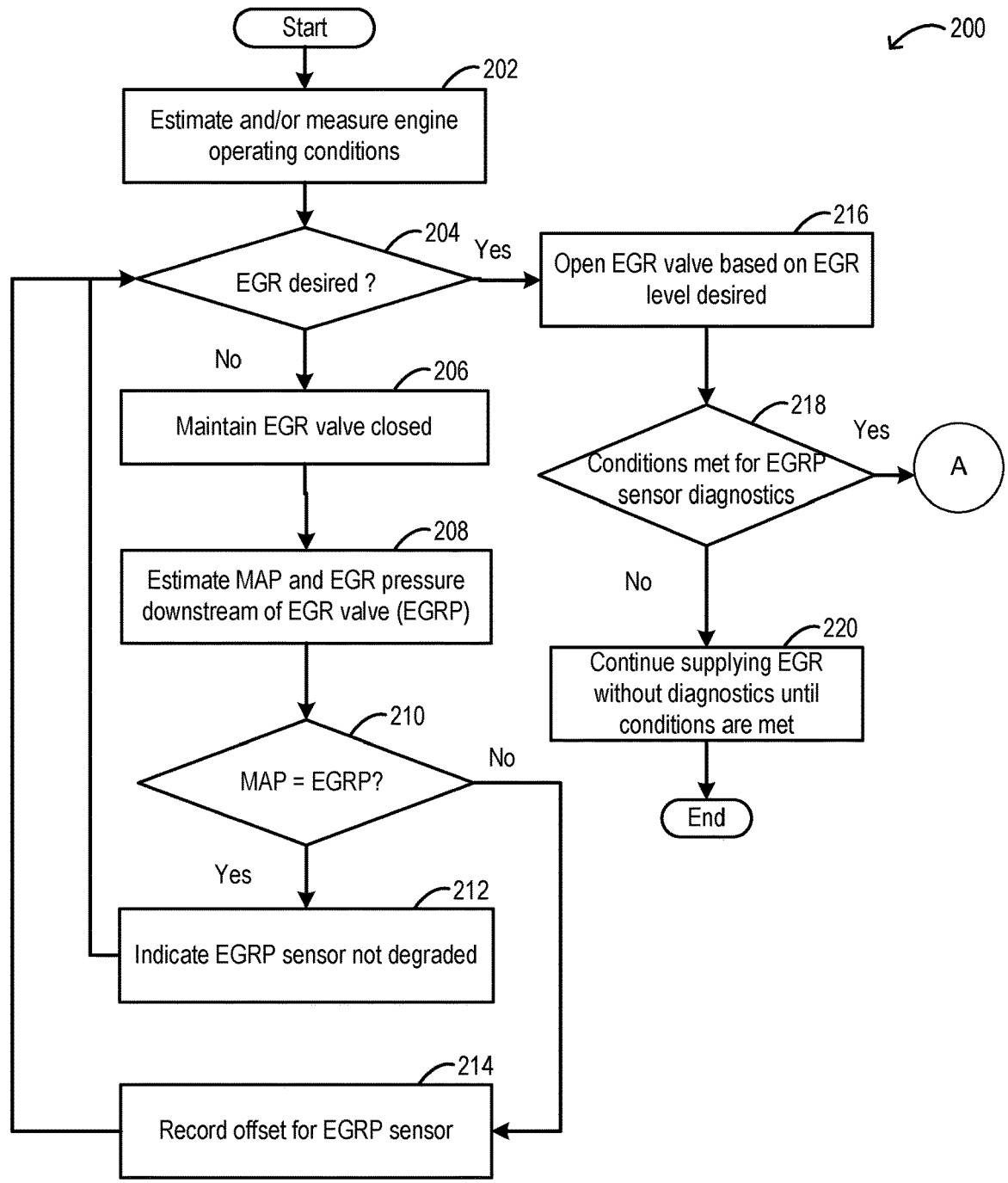
FIG. 2A-2B show a flow-chart of an example method for rationalizing and diagnosing a pressure sensor of the EGR system.
Figure 2B:
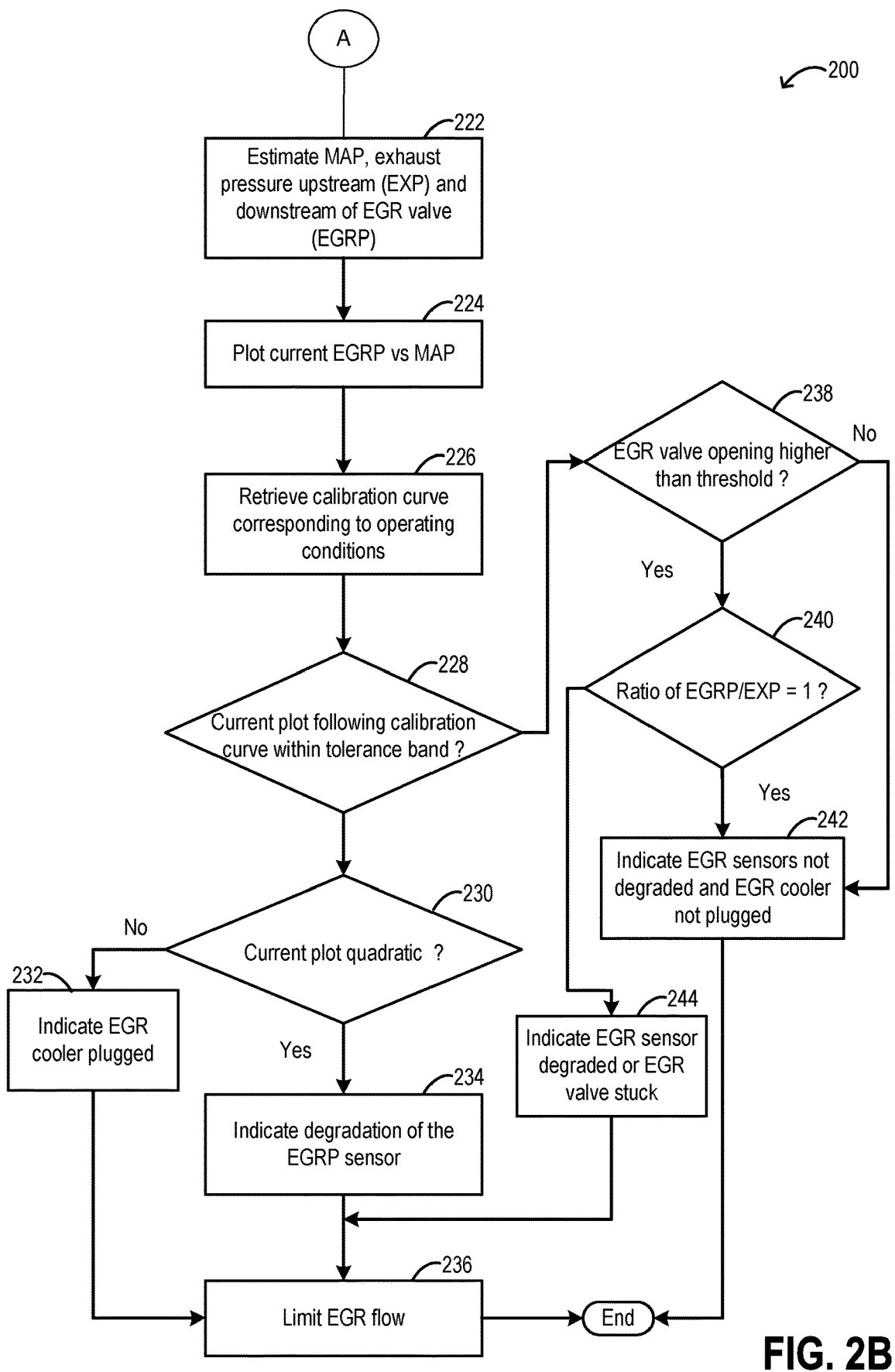

FIGS. 2A-2B show an example method 200 for rationalizing and diagnosing a pressure sensor (such as the second EGR pressure sensor 174 in FIG. 1) coupled downstream of an EGR valve (such as EGR valve 143 in FIG. 1) of the EGR system. Further, the method may be used to determine if an EGR cooler (such as EGR cooler 145 in FIG. 1) coupled to the EGR passage downstream of the EGR valve is plugged with contaminants causing a restriction in EGR flow through the EGR passage. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method begins at 202 and includes estimating and/or measuring vehicle and engine operating conditions. The operating conditions may include vehicle speed, engine speed and load, engine temperature, exhaust temperature, gas pressures, mass air flow, etc. Further, ambient conditions such as ambient temperature, pressure, and humidity may be estimated.

At 204, the routine may include determining if EGR is desired. The controller may determine the need for EGR flow based on engine operating conditions including engine load, engine speed, and engine temperature. In one example, EGR may be desired when the engine is not experiencing cold-start conditions and the engine load is between a lower threshold load and a higher threshold load. In another example, EGR may not be desired during cold-start conditions, engine idling conditions (engine load lower than the lower threshold load), and peak load conditions (engine load higher than the higher threshold load). If it is determined that EGR is not desired, at 206, the EGR valve may be maintained in a closed position and exhaust gas may not flow from the exhaust passage to the intake passage via the EGR passage.

While the EGR valve is closed, at 208, intake manifold air pressure (MAP) may be estimated via a manifold air pressure sensor (such as MAP sensor 124 in FIG. 1) and a second EGR pressure downstream of the EGR valve (EGRP) may be estimated via the EGR pressure sensor coupled downstream of the EGR valve (EGRP sensor).

At 210, the routine includes determining if the MAP is substantially equal (such as within 5% difference) to EGRP. Since the EGR valve is closed and there is no EGR flow through the EGR passage, the EGR pressure sensor downstream of the closed EGR valve may be in fluidic equilibrium with the intake manifold and therefore the pressure at the MAP sensor would be substantial with the pressure at the EGR sensor downstream of the EGR valve. If it is determined that MAP is substantially equal to EGRP, at 212, it may be inferred that the second EGR pressure downstream of the EGR valve (EGRP sensor) is not degraded and is accurately estimating pressure. It may be noted that there is no offset in the reading of eth EGRP sensor. The routine may then return to step 204.

If it is determined that the MAP is not substantially different from the EGRP, it may be inferred that there is an offset in the output of the EGR sensor and the EGR sensor reading may be rationalized during subsequent EGR flow rate estimation. At 214, an offset for the EGRP sensor may be recorded to be used during EGR flow rate estimation. As an example, the offset may be the difference between MAP and EGRP. During subsequent EGR flow, this offset may be added to the EGRP sensor reading to improve the accuracy of the pressure reading. By estimating the offset and rationalizing the EGRP sensor, accuracy of estimation of EGR flow rates may be improved, thereby reducing the possibility of excess or lack of EGR flow.

In one example, during a vehicle-on condition when the ignition is on but the engine is stationary (such as during a key-up condition, idle stop condition, and/or an engine shutdown) for at least a threshold duration amount of time, the offset measurements between the MAP sensor and the EGRP sensor may be carried out to exclude any effect of pressure pulsation dynamics. This offset learned may be stored in a Keep Alive Memory (KAM) vector of the controller based on EGRP (174) sensor on-board electronics temperature. During subsequent engine operation, the offset may be retrieved from the KAM array (vs temperature). The learned offset may be continually updated when the above mentioned engine-off conditions occur. The routine may then return to step 204.

If at 204 it is determined that EGR is desired, at 216, the EGR valve may be opened to deliver EGR from the exhaust passage to the intake passage. The degree of opening of the EGR valve may be proportional to the level of EGR desired. The controller may estimate the level of EGR desired based on engine temperature, engine load, and engine speed. In one example, the controller may send a signal to an actuator of the EGR valve to actuate the valve to an opening proportional to the desired EGR level.

At 218, the routine includes determining if conditions are met for EGR sensor diagnostics. The conditions for EGR sensor diagnostics may include a pre-calibrated EGRP v. MAP plot corresponding to the current engine operating conditions. For a new or newly serviced EGRP sensor, at a plurality of engine operating conditions such as engine speed-load points, while EGR is being delivered, a plot of EGRP v. MAP may be recorded and stored in the controller memory. When the EGR valve is closed, and in absence of an offset of the EGRP sensor, in the plot, MAP may be equal to EGRP. As the EGR valve opening is increased (from closed to fully open), corresponding to each engine speed-load point, the MAP vs. EGRP plot may follow a quadratic curve (starting from zero). Such quadratic curves may be pre-calibrated during steady state engine operations over the plurality of engine speed-load points and further interpolated to determine quadratic curves corresponding to other speed-load points. If the current speed-load condition corresponds to that of a pre-calibrated quadratic curve, diagnostics of the EGHR valve may be carried out.

FIG. 3 shows an example plot 300 of EGR pressure downstream of the EGR valve (EGRP) vs. intake manifold air pressure (MAP) over a range of engine operating conditions. The x-axis denotes MAP (in Hg) and the y-axis denotes EGRP (in Hg). The first plot 302 corresponds to the condition when the EGR valve is closed and MAP is equal to EGRP. The second plot, line 304, corresponds to a first set of engine speed-load condition and the plot may extend from line 302 where the EGR valve opening is zero to a point where the EGR valve opening is highest. Similarly, plots 306, 308, 310, 312, 314, 316, and 318 correspond to distinct sets of engine speed-load condition and each plot may extend from line 302 where the EGR valve opening is zero to a point where the EGR valve opening is highest. The engine speed, load operating point determines the coefficients of the respective quadratic curve, while the MAP pressure determines the starting point along the line 302. In this example, eight quadratic curves corresponding to eight distinct engine speed-load conditions are shown. Each of these plots are either pre-calibrated during EGR delivery while the engine is being operated at that speed-load condition or has been interpolated from related data. There may be a large number of such quadratic curves, each curve corresponding to an engine speed-load condition.

Returning to FIG. 2A, if at 218, it is determined that conditions are not met for EGRP sensor diagnostics, at 220, supply of EGR may be continued without EGRP diagnostics until the conditions are met. If it is determined that conditions are met for EGRP sensor diagnostics, the routine may proceed to step 222 in FIG. 2B.

At 222, intake manifold air pressure (MAP) may be estimated via the manifold air pressure sensor, a first EGR pressure upstream of the EGR valve (EXP) may be estimated via the EGR pressure sensor coupled upstream of the EGR valve (ExP sensor), and a second EGR pressure downstream of the EGR valve (EGRP) may be estimated via the EGR pressure sensor coupled downstream of the EGR valve (EGRP sensor).

At 224, the estimated second EGR pressure downstream of the EGR valve (EGRP) may be plotted against the estimated intake manifold air pressure (MAP) corresponding to the current engine speed-load condition. This plot may be termed as the current EGRP vs. MAP plot. At 226, a calibration curve corresponding to the current engine operating condition (such as engine speed-load condition) may be retrieved from the controller memory. The calibration curve may be a quadratic curve of EGRP vs. MAP plotted over a plurality of EGR openings at the current engine operating condition.

At 228, the routine includes determining if the current EGRP vs. MAP plotted during current engine speed-load conditions follow the retrieved, calibrated EGRP vs. MAP plot. For the current engine speed-load condition, as the EGR valve opening changes, the current EGRP vs. MAP may follow the calibration plot within a tolerance band. The tolerance band may be based on tolerance levels of measurements via the EGRP sensor and the MAP sensor. As an example, the tolerance band may also be based on statistical margins while interpolation of the EGRP vs. MAP plot. In one example, the tolerance band may be ±10%. If the EGRP sensor is not degraded, the current EGRP vs. MAP may correlate to the retrieved EGRP vs. MAP plot. If there is an offset in the EGRP sensor reading, the current EGRP vs. MAP may not start with ΔP being zero when the EGR valve was closed but once the EGR valve opens, if the EGRP sensor is not degraded, the current EGRP vs. MAP may follow the retrieved EGRP vs. MAP plot within the tolerance band.

If it is determined that the current EGRP vs. MAP plot does not follow the retrieved, calibrated EGRP vs. MAP plot within the tolerance band, it may be inferred that the EGRP sensor output may not be accurate or the EGR cooler is plugged with contaminants. At 230, the routine includes determining if the current EGRP vs. MAP plot follows a quadratic pattern similar to the retrieved, calibrated EGRP vs. MAP plot. In one example, the controller may estimate if instead of following the quadratic pattern, the current EGRP vs. MAP plot follows a different curve (such as following a different polynomial equation). If the EGR cooler is contaminated with particles in the exhaust gas being deposited on the cooler over time, the EGR cooler may get plugged causing a restriction in the EGR flow which may be manifested in the EGRP measurement. Further, the change in EGR pressure caused by the contamination in the EGR cooler may cause the EGRP vs. MAP plot to divert from the retrieved, calibrated EGRP vs. MAP plot and not follow the expected quadratic pattern.

If it is determined that the current EGRP vs. MAP plot follows a quadratic pattern yet deviates from the retrieved, calibrated EGRP vs. MAP plot outside of the tolerance band, it may be inferred that the EGR cooler is not plugged but the EGRP sensor output may be erroneous. At 234, a degradation of the EGRP sensor may be indicated and a corresponding diagnostics code may be set. The routine may then proceed to step 236. If it is determined that the current EGRP vs. MAP plot does follows a quadratic pattern and deviates from the retrieved, calibrated EGRP vs. MAP plot outside of the tolerance band, it may be inferred that the deviation may be due to due to a plugged EGR cooler instead of a degraded EGRP sensor. At 232, a plugging of the EGR cooler may be indicated and a corresponding diagnostics code may be set. The operator may be indicated to get the engine serviced for cleaning/replacement of the EGR cooler. The routine may then proceed to step 236.

At 236, in response to indication of degradation of EGRP sensor or plugging of the EGR cooler, flow of high pressure EGR may be limited during subsequent engine operation. During EGR demand, a higher volume of exhaust gas may be routed to the intake manifold via the low pressure EGR passage instead of the high pressure EGR passage. Also, upon indication of EGRP sensor degradation, estimation of EGR flow-rate through the EGR passage may be carried out based on EGR valve opening instead of using the output of the EGRP sensor.

Returning to step 228, if it is determined that the current EGRP vs. MAP plot follows the retrieved, calibrated EGRP vs. MAP plot within the threshold range, at 238, the routine includes determining if the opening of the EGR valve is higher than a threshold opening. The threshold opening corresponds to a level above which the valve does not provide a constriction in the flow path and EGR may flow through the EGR valve without a pressure drop at the valve. In one example, the threshold opening may be in a range of 80%-90%. If it is determined that the EGR valve opening is lower than the threshold opening, based on the determination that the current EGRP vs. MAP plot follows the retrieved, calibrated EGRP vs. MAP plot within the threshold range, at 242, it may be inferred that the EGRP sensor is not degraded and the EGR cooler is not plugged from contamination. The EGRP sensor may be continued to be used for EGR flowrate estimation.

If at 238, it is determined that the opening of the EGR valve is higher than a threshold opening, at 240, the routine includes determining if EGRP/EXP ratio is substantially equal to one (such as within 5% difference), such as the pressure in the EGR passage upstream of the EGR valve is substantially equal to the pressure downstream of the EGR valve. Since the higher than threshold opening of the EGR valve does not provide any constriction to the EGR flow, the pressure may be equal across the valve.

If it is determined that EGRP/EXP ratio is substantially one, it may be inferred both the EGR pressure sensors upstream and downstream of the EGR valve are robust. At 242, the routine includes indicating that both the ExP sensor and the EGRP sensor are not degraded. Further, due to the expected EGR pressure profiles, it may be indicated that the EGR cooler is not plugged and allows for smooth EGR flow.

If it is determined that EGRP/EXP ratio is not substantially equal to one even when the current EGRP vs. MAP plot follows the retrieved, calibrated EGRP vs. MAP plot within the threshold range, at 244, it may be inferred that the EGR sensor upstream of the EGR valve is degraded so that the pressure estimated upstream of the EGR valve is different from that downstream of the valve. Also, the difference in pressure could be sue to the EGR valve being stuck in a partially closed position and not opening to higher than the threshold opening, thereby causing a constriction and pressure drop in the EGR flow. Diagnostic codes may be set indicating a potentially degradation of the ExP sensor or the EGR valve. The method may then proceed to step 236 to limit supply of high pressure EGR.

In one example, a distinction between a degraded EGRP and a plugged EGR may be made based on the EGRP output. If the EGR cooler is plugged, it would not affect EGRP pressure measurement at low EGR flow rates. The EGRP pressure reading at low flow rates may correspond to points along or in proximity of line 302 in FIG. 3. As EGR flow rate increases, a plugged cooler may manifest in the EGRP reading by deviating from the retrieved quadratic curve.

A degraded EGRP may either have a slope or offset error. While this can be determined using the EGRP/EXP ratio method, it may also manifest in the MAP vs EGRP plot as a translation of the quadratic curve if there is an offset error (EGRP vs MAP is outside of the retrieved curve's tolerance for all EGR flows). A slope error may look much more similar to a blocked cooler, however there may be at least one speed-load operating condition where the plotted EGRP vs MAP point does not fall close to line 302 at low flow conditions, indicating a faulted EGRP sensor and not a plugged cooler.

In this way, a current curve of the estimated MAP vs. the estimated EGR pressure downstream of the EGR valve may be generated for a current engine speed-load condition, a calibration plot from the plurality of calibration plots corresponding to the current engine speed-load condition may be retrieved from a controller memory, and in response to the current curve deviating from the retrieved calibration plot by over a threshold, a degradation of the second EGR pressure sensor or contamination of the EGR cooler may be indicated. Contamination of the EGR cooler may be confirmed in response to the current curve not following a quadratic equation and deviating from the retrieved calibration plot by over the threshold.

FIG. 4 shows an example timeline 400 illustrating diagnostics of a first EGR pressure sensor (such as ExP sensor 172 in FIG. 1) coupled upstream of an EGR valve (such as EGR valve 143 in FIG. 1) housed in a high pressure EGR passage (such as EGR passage 141 in FIG. 1) and a second EGR pressure sensor (such as EGRP sensor 174 in FIG. 1) coupled downstream of the EGR valve. A flowrate of EGR passing through the EGR passage may be estimated based on outputs of the first sensor and the second sensor. The horizontal (x-axis) denotes time and the vertical markers t1-t3 identify significant times in EGR pressure sensor diagnostics.

The first plot, line 402, shows a degree of opening of the EGR valve regulating EGR flow from the exhaust passage to the intake passage via the EGR passage. Dashed line 403 denotes a threshold EGR valve opening above which EGR flow through the EGR passage may be unobstructed. The second plot, line 404, shows a change in manifold air pressure (MAP) as estimated via a MAP sensor (such as MAP sensor in FIG. 1) coupled to the intake manifold. The third plot, line 406, shows a change in EGR pressure (EXP) upstream of the EGR valve as downstream via the first EGR pressure sensor. The fourth plot, line 408, shows a change in EGR pressure (EGRP) downstream of the EGR valve as estimated via the second EGR pressure sensor. The fifth plot, line 410, denotes a ratio of the EGR pressure (EXP) upstream of the EGR valve to the EGR pressure (EGRP) downstream of the EGR valve. The sixth plot, line 412, shows a position of a flag denoting degradation of one or more of the first EGR pressure sensor and the second EGR pressure sensor.

Prior to time t1, EGR is not desired for engine operation and the EGR valve is maintained in an off position. During this time, MAP is substantially equal to EGRP indicating that there is no off-set in the output of the second EGR pressure sensor. Since EGR is not flowing through the EGR passage, EXP is not monitored. The flag is maintained in an off position. At time t1, in response to changes in engine operating conditions, EGR flow is enabled. The level of EGR flow desired by the engine is estimated by the controller as a function of engine speed, engine load, and engine temperature. The opening of the EGR valve is adjusted based on the desired level of EGR flow. Between t1 and t2, the EGR valve opening is lower than the threshold 403, thereby indicating an effect of EGR valve opening on the EGR flow rate. The EGR flow rate is estimated as a function of a difference in EXP and EGRP.

At time t2, in response to increased demand for EGR, the EGR valve opening is increased to above the threshold level 403 indicating that EGR flow through the valve is now unobstructed. During this time, the ratio of EXP and EGRP is monitored. Since the EXP/EGRP ratio is substantially equal to 1, it is inferred that the first and second EGR pressure sensors are not degraded and the flag is maintained in the off position. After time t3, in response to the decrease in EGR demand, the opening of the EGR valve is decreased. As described in method 200, as the EGR valve opening is adjusted, EGRP vs MAP is plotted and compared to a pre-calibrated EGRP vs MAP plot corresponding to the same engine speed-load condition to detect degradation of the second EGR pressure sensor and/or clogging of an EGR cooler.

In this way, by monitoring EGR pressure downstream of an EGR cooler and comparing to MAP, the EGR pressure sensor downstream of the HER valve may be rationalized and diagnosed. By co-relating a pre-calibrated EGRP vs. MAP corresponding to a current engine speed-load condition to a current EGRP vs. MAP plot, degradation of the EGRP sensor may be identified. The technical effect of monitoring the current EGRP vs. MAP plot is that a plugging of the EGR cooler may also be detected. Overall, by monitoring robustness of the EGR pressure sensor and EGR cooler, EGR flow rate estimation may be improved and desired engine dilution may be provided, thereby improving fuel efficiency and emissions quality.

An example method for an engine in a vehicle comprises: diagnosing degradation of an exhaust gas recirculation (EGR) pressure sensor based on comparison of a current relationship between an output of the EGR pressure sensor and a manifold air pressure (MAP), and a pre-calibrated relation between the output of the EGR pressure sensor and the MAP. In the preceding example, additionally or optionally, the EGR pressure sensor is a second EGR pressure sensor coupled to an EGR passage downstream of an EGR valve, the EGR passage further including, a first EGR pressure sensor coupled to the EGR passage upstream of the EGR valve. In any or all of the preceding examples, additionally or optionally, the output of the EGR pressure sensor includes an EGR pressure (EGRP) output of the second EGR pressure sensor, and wherein the current relationship between the output of the EGR pressure sensor and the MAP is a first plot of EGRP vs. MAP at a current engine speed-load condition. In any or all of the preceding examples, additionally or optionally, the pre-calibrated relation between the output of the EGR pressure sensor and the MAP is a second plot of EGRP vs. MAP pre-calibrated at an engine speed-load condition corresponding to the current engine speed-load condition, the second plot following a quadratic curve over an increase in opening of the EGR valve. Any or all of the preceding examples, the method further comprising, additionally or optionally, indicating the second EGR pressure sensor degraded in response to the first plot deviating from the second plot outside of a tolerance band, and the first plot following a quadratic curve. Any or all of the preceding examples, the method further comprising, additionally or optionally, indicating an EGR cooler being plugged in response to the first plot deviating from the second plot outside of the tolerance band, and the first plot not following a quadratic curve. In any or all of the preceding examples, additionally or optionally, the EGR cooler is coupled to the EGR passage downstream of each of the first EGR pressure sensor, the EGR valve, and the second EGR pressure sensor, and wherein the EGR passage is a high pressure EGR passage connecting an exhaust passage, upstream of an exhaust turbine, to an intake manifold, downstream of an intake compressor. Any or all of the preceding examples, the method further comprising, additionally or optionally, upon opening the EGR valve to above a threshold opening, in response to a ratio of the output of the second EGR pressure sensor to an output of the first EGR pressure sensor being substantially equal to one, indicating each of the first EGR pressure sensor and the second EGR pressure sensor not degraded. Any or all of the preceding examples, the method further comprising, additionally or optionally, during a closure of the EGR valve, rationalizing the second EGR pressure sensor based on a difference between the output of the second EGR pressure sensor and the MAP. Any or all of the preceding examples, the method further comprising, additionally or optionally, during flow of EGR through the EGR passage, estimating a flowrate of EGR based on each of the output of the first EGR pressure sensor and the output of the second EGR pressure sensor. Any or all of the preceding examples, the method further comprising, additionally or optionally, in response to the indication of the EGR cooler being plugged or the indication of the second EGR pressure sensor being degraded, closing the EGR valve and reducing flow of EGR through the EGR passage.

Another example method for an engine in a vehicle, comprises: during flow of exhaust gas recirculation (EGR) through a high-pressure EGR system at a current engine speed-load condition, estimating an EGR pressure (EGRP) downstream of an EGR valve via an EGR pressure sensor, estimating a manifold air pressure (MAP) via a manifold air pressure sensor, generating a first plot of EGRP vs. MAP over a range of openings of the EGR valve at the current engine speed-load condition, retrieving a second plot of EGRP vs. MAP over the range of openings of the EGR valve at an engine speed-load condition corresponding to the current engine speed-load condition, and selectively indicating degradation of the EGR pressure sensor based on a correlation between the first plot and the second plot. In the preceding example, additionally or optionally, selectively indicating degradation includes indicating that the EGR pressure sensor is degraded in response to the second plot being outside of a tolerance range of the first plot, the threshold range including an upper level and a lower level. In any or all of the preceding examples, additionally or optionally, the second plot is retrieved from a memory of a controller, and wherein a plurality of pre-calibrated EGRP vs. MAP lots over the range of openings of the EGR valve corresponding to a plurality of engine speed-load conditions are saved in the memory of the controller. In any or all of the preceding examples, additionally or optionally, during the flow of EGR through an EGR passage of the high-pressure EGR system, a flow-rate of the EGR is estimated based on a pressure drop across the EGR valve as estimated via each of the EGR pressure sensor coupled to the EGR passage downstream of the EGR valve and another EGR pressure sensor coupled to the EGR passage upstream of the EGR valve. In any or all of the preceding examples, additionally or optionally, selectively indicating degradation includes indicating that the EGR pressure sensor is not degraded in response to the second plot being within the tolerance range of the first plot and the EGR pressure downstream of the EGR valve being substantially equal to the EGR pressure upstream of the EGR valve during a higher than threshold opening of the EGR valve. Any or all of the preceding examples, the method further comprising, additionally or optionally, estimating an off-set of the EGR pressure sensor based on EGRP being substantially equal to MAP upon closure of the EGR valve.

Another example for an engine, comprises: an exhaust gas recirculation (EGR) passage coupling an exhaust passage upstream of an exhaust turbine to an intake passage downstream of an intake compressor, an EGR valve housed in the EGR passage to regulate EGR flow through the EGR passage, a first EGR pressure sensor coupled to the EGR passage upstream of the EGR valve and a second EGR pressure sensor coupled to the EGR passage downstream of the EGR valve, an EGR cooler housed in the EGR passage downstream of each of the first EGR pressure sensor, the EGR valve, and the second EGR pressure sensor, a manifold air pressure (MAP) sensor coupled to an engine intake manifold, and a controller storing instructions in non-transitory memory that, when executed, cause the controller to: when the first EGR pressure sensor is new, calibrate a plurality of calibration plots of an output of the second EGR pressure sensor (EGRP) vs. an output of the MAP sensor (MAP) over a range of openings of the EGR valve for a plurality of engine speed-load conditions, and during subsequent engine operation, carry out a diagnostic routine for the second EGR pressure sensor and the EGR cooler based on the calibrated plots. In any of the preceding examples, additionally or optionally, the controller includes further instructions to: during the diagnostic routine, for each open position of the EGR valve, estimate the manifold air pressure (MAP) via the MAP sensor, estimate an EGR pressure downstream of the EGR valve via the second EGR pressure sensor, plot a current curve of the estimated MAP vs. the estimated EGR pressure downstream of the EGR valve for a current engine speed-load condition, retrieve a calibration plot from the plurality of calibration plots corresponding to the current engine speed-load condition, and in response to the current curve deviating from the retrieved calibration plot by over a threshold, indicate a degradation of the second EGR pressure sensor or contamination of the EGR cooler. In any or all of the preceding examples, additionally or optionally, the controller includes further instructions to: in response to the current curve not following a quadratic equation and deviating from the retrieved calibration plot by over the threshold, indicate contamination of the EGR cooler.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
diagnosing degradation of an exhaust gas recirculation (EGR) pressure sensor based on comparison of a current relationship between an output of the EGR pressure sensor and a manifold air pressure (MAP) over a range of openings of an EGR valve in an EGR passage at a current engine speed-load condition, and a pre-calibrated relationship between the output of the EGR pressure sensor and the MAP at an engine speed-load condition corresponding to the current engine speed-load condition.

2. The method of claim 1, wherein the EGR pressure sensor is coupled to the EGR passage downstream of the EGR valve.

3. The method of claim 2, wherein the current relationship between the output of the EGR pressure sensor and the MAP is a first plot of EGRP vs. MAP at the current engine speed-load condition.

4. The method of claim 3, wherein the pre-calibrated relationship between the output of the EGR pressure sensor and the MAP is a second plot of EGRP vs. MAP pre-calibrated at an engine speed-load condition corresponding to the current engine speed-load condition, the second plot following a quadratic curve over an increase in opening of the EGR valve.

5. The method of claim 4, further comprising, indicating the EGR pressure sensor is degraded in response to the first plot deviating from the second plot outside of a tolerance band, and the first plot following a quadratic curve.

6. The method of claim 5, further comprising, indicating an EGR cooler being plugged in response to the first plot deviating from the second plot outside of the tolerance band, and the first plot not following a quadratic curve.

7. The method of claim 6, wherein the EGR cooler is coupled to the EGR passage downstream of the EGR pressure sensor, and wherein the EGR passage is a high pressure EGR passage connecting an exhaust passage, upstream of an exhaust turbine, to an intake manifold, downstream of an intake compressor.

8. The method of claim 5, wherein the EGR pressure sensor is a second EGR pressure sensor coupled downstream the EGR valve, the EGR passage further comprising a first EGR pressure sensor coupled upstream the EGR valve, and the method further comprising, upon opening the EGR valve to above a threshold opening, in response to a ratio of the output of the EGR pressure sensor to an output of the first EGR pressure sensor being substantially equal to one, indicating each of the first EGR pressure sensor and the second EGR pressure sensor not degraded.

9. The method of claim 8, further comprising, during a closure of the EGR valve, estimating an offset of the second EGR pressure sensor based on a difference between the output of the EGR pressure sensor and the MAP.

10. The method of claim 8, further comprising, during flow of EGR through the EGR passage, estimating a flowrate of EGR based on each of the output of the first EGR pressure sensor and the output of the second EGR pressure sensor.

11. The method of claim 5, further comprising, in response to the indication of the EGR cooler being plugged or the indication of the EGR pressure sensor being degraded, closing the EGR valve and reducing flow of EGR through the EGR passage.

12. A method for an engine in a vehicle, comprising:
during flow of exhaust gas recirculation (EGR) through a high-pressure EGR system at a current engine speed-load condition,
estimating an EGR pressure (EGRP) downstream of an EGR valve via an EGR pressure sensor;
estimating a manifold air pressure (MAP) via a manifold air pressure sensor;
generating a first plot of EGRP vs. MAP over a range of openings of the EGR valve at the current engine speed-load condition;
retrieving a second plot of EGRP vs. MAP over the range of openings of the EGR valve at an engine speed-load condition corresponding to the current engine speed-load condition; and
selectively indicating degradation of the EGR pressure sensor based on a correlation between the first plot and the second plot.

13. The method of claim 12, wherein selectively indicating degradation includes indicating that the EGR pressure sensor is degraded in response to the second plot being outside of a tolerance range of the first plot, the tolerance range including an upper level and a lower level.

14. The method of claim 12, wherein the second plot is retrieved from a memory of a controller, and wherein a plurality of pre-calibrated EGRP vs. MAP plots over the range of openings of the EGR valve corresponding to a plurality of engine speed-load conditions are saved in the memory of the controller.

15. The method of claim 13, wherein during the flow of EGR through an EGR passage of the high-pressure EGR system, a flow-rate of the EGR is estimated based on a pressure drop across the EGR valve as estimated via each of the EGR pressure sensor coupled to the EGR passage downstream of the EGR valve and another EGR pressure sensor coupled to the EGR passage upstream of the EGR valve.

16. The method of claim 15, wherein selectively indicating degradation includes indicating that the EGR pressure sensor is not degraded in response to the second plot being within the tolerance range of the first plot and the EGR pressure downstream of the EGR valve being substantially equal to the EGR pressure upstream of the EGR valve during a higher than threshold opening of the EGR valve.

17. The method of claim 12, further comprising, estimating an off-set of the EGR pressure sensor based on EGRP being substantially equal to MAP upon closure of the EGR valve.

18. A system for an engine, comprising:
an exhaust gas recirculation (EGR) passage coupling an exhaust passage upstream of an exhaust turbine to an intake passage downstream of an intake compressor;
an EGR valve housed in the EGR passage to regulate EGR flow through the EGR passage;
a first EGR pressure sensor coupled to the EGR passage upstream of the EGR valve and a second EGR pressure sensor coupled to the EGR passage downstream of the EGR valve;
an EGR cooler housed in the EGR passage downstream of each of the first EGR pressure sensor, the EGR valve, and the second EGR pressure sensor;
a manifold air pressure (MAP) sensor coupled to an engine intake manifold; and
a controller storing instructions in non-transitory memory that, when executed, cause the controller to:
when the first EGR pressure sensor is new, calibrate a plurality of calibration plots of an output of the second EGR pressure sensor (EGRP) vs. an output of the MAP sensor over a range of openings of the EGR valve for a plurality of engine speed-load conditions; and
during subsequent engine operation, carry out a diagnostic routine for the second EGR pressure sensor and the EGR cooler based on the calibrated plots.

19. The system of claim 18, wherein the controller includes further instructions to:
during the diagnostic routine, for each open position of the EGR valve,
estimate the MAP via the MAP sensor;
estimate an EGR pressure downstream of the EGR valve via the second EGR pressure sensor;
plot a current curve of the estimated MAP vs. the estimated EGR pressure downstream of the EGR valve for a current engine speed-load condition;
retrieve a calibration plot from the plurality of calibration plots corresponding to the current engine speed-load condition; and
in response to the current curve deviating from the retrieved calibration plot by over a threshold, indicate a degradation of the second EGR pressure sensor or contamination of the EGR cooler.

20. The system of claim 19, wherein the controller includes further instructions to: in response to the current curve not following a quadratic equation and deviating from the retrieved calibration plot by over the threshold, indicate contamination of the EGR cooler.

* * * * *